(12) United States Patent
Todd et al.

(10) Patent No.: US 11,205,229 B1
(45) Date of Patent: Dec. 21, 2021

(54) CONTENT STORAGE MANAGEMENT BASED ON MULTIDIMENSIONAL VALUATION MODELS

(71) Applicant: EMC IP Holding Company LLC, Hopkinton, MA (US)

(72) Inventors: Stephen Todd, Shrewsbury, MA (US); Jeffrey Norton, Laguna Niguel, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 509 days.

(21) Appl. No.: 15/797,663

(22) Filed: Oct. 30, 2017

Related U.S. Application Data

(63) Continuation-in-part of application No. 15/669,523, filed on Aug. 4, 2017, now Pat. No. 10,915,961.

(51) Int. Cl.
  *G06Q 10/10*  (2012.01)
  *G06Q 40/06*  (2012.01)
  *G06Q 10/06*  (2012.01)

(52) U.S. Cl.
  CPC .......... *G06Q 40/06* (2013.01); *G06Q 10/067* (2013.01); *G06Q 10/10* (2013.01)

(58) Field of Classification Search
  None
  See application file for complete search history.

(56) References Cited

U.S. PATENT DOCUMENTS

| | | | | |
|---|---|---|---|---|
| 6,609,118 | B1* | 8/2003 | Khedkar | G06Q 10/10 705/27.1 |
| 7,751,628 | B1* | 7/2010 | Reisman | H04N 21/440227 382/232 |
| 2001/0034686 | A1* | 10/2001 | Eder | G06Q 40/02 705/36 R |
| 2005/0209940 | A1* | 9/2005 | Lea | G06Q 40/00 705/35 |
| 2005/0253704 | A1* | 11/2005 | Neuwirth | G06Q 10/087 340/539.13 |
| 2008/0027841 | A1* | 1/2008 | Eder | G06Q 40/00 705/35 |
| 2008/0222346 | A1* | 9/2008 | Raciborski | G06F 12/0246 711/102 |

(Continued)

OTHER PUBLICATIONS

U.S. Appl. No. 14/863,783 filed in the name of Stephen Todd et al. filed Sep. 24, 2015 and entitled "Unstructured Data Valuation."

(Continued)

*Primary Examiner* — William J Jacob
(74) *Attorney, Agent, or Firm* — Ryan, Mason & Lewis, LLP

(57) ABSTRACT

A set of valuations is obtained for a set of assets of a given enterprise. The enterprise has a plurality of groups associated therewith, and each of the valuations is computed using a multi-dimensional model configured to generate cross-group impact values with respect to each asset and two or more of the groups associated with the enterprise. One or more storage locations within a storage infrastructure associated with the enterprise to store the assets are determined based on the valuations for the assets. For example, the one or more storage locations may be determined based on a content balancing process that computes an optimal storage location to store each asset in order to minimize overall cost to the enterprise.

19 Claims, 10 Drawing Sheets

(56) References Cited

U.S. PATENT DOCUMENTS

| | | | | |
|---|---|---|---|---|
| 2009/0222470 A1* | 9/2009 | Kemp | ............... | G06F 16/283 |
| 2010/0179861 A1* | 7/2010 | Teerilahti | ........... | G06Q 30/0278 |
| | | | | 705/7.33 |
| 2010/0332560 A1* | 12/2010 | Gerbasi, III | ....... | H04N 21/4335 |
| | | | | 707/812 |
| 2011/0153448 A1* | 6/2011 | Thomas | ........... | G06Q 10/06313 |
| | | | | 705/26.3 |
| 2013/0339205 A1* | 12/2013 | Vann-Adibe | ........... | G06Q 40/00 |
| | | | | 705/35 |
| 2017/0345070 A1* | 11/2017 | Goldberg | ................ | H04W 4/02 |

OTHER PUBLICATIONS

U.S. Appl. No. 14/998,112 filed in the name of Stephen Todd et al. filed Dec. 24, 2015 and entitled "Data Valuation Based on Development and Deployment Velocity."

U.S. Appl. No. 15/135,790 filed in the name of Stephen Todd et al. filed Apr. 22, 2016 and entitled "Data Valuation at Content Ingest."

U.S. Appl. No. 15/135,817 filed in the name of Stephen Todd et al. filed Apr. 22, 2016 and entitled "Data Value Structures."

U.S. Appl. No. 15/136,327 filed in the name of Stephen Todd et al. filed Apr. 22, 2016 and entitled "Calculating Data Value via Data Protection Analytics."

U.S. Appl. No. 15/669,523 filed in the name of Stephen Todd et al. filed Aug. 7, 2017 and entitled "Calculating Asset Value Using Multi-Dimensional Models."

Doug Laney, "The Economics of Information Assets," The Center For Infonomics, http://www.smarter-companies.com/group/icpractitioners/forum/topics/abstract-and-slides-for-today-s-session-on-infonomics-by-doug, Sep. 13, 2011, 22 pages.

Lieven Vandenberghe, "11 Constrained Least Squares," Lecture Slides, EE133A—Applied Numerical Computing, http://www.seas.ucla.edu/~vandenbe/133A/lectures/cls.pdf, Spring Quarter 2017, 38 pages.

* cited by examiner

| Valuation Matrix | Valuation System 1 | Valuation System 2 |
|---|---|---|
| | 1e+01  2 1e+06<br>4e+00  12 6e+00<br>1e+09  4 8e+00 | 209 342 88<br>101 812 453<br>8  79  4 |
| Location 1 – Data Stored | 0 | 6.463338e+11 |
| Location 2 – Data Stored | 1.00e+12 | -6.213455e+11 |
| Location 3 – Data Stored | 0 | 9.750117e+11 |

FIG. 8

CONTENT STORAGE MANAGEMENT BASED ON MULTIDIMENSIONAL VALUATION MODELS

CROSS REFERENCE TO RELATED APPLICATION

The present application is a continuation-in-part of, and therefore claims priority to, U.S. patent application Ser. No. 15/669,523, entitled "Calculating Asset Value Using Multi-Dimensional Models" filed Aug. 4, 2017, the disclosure of which is incorporated by reference herein in its entirety.

FIELD

The field relates generally to data processing and, more particularly, to asset valuation techniques used to manage content storage.

BACKGROUND

Valuation algorithms allow owners of content to associate economic or business value to their data assets. This value can then potentially be used as input to a variety of business functions. Some existing approaches calculate the total value of a data set based on a single-value evaluation. Calculating the total value of a data set based on a single-value evaluation results in a single cost value. Such a single cost value can limit the usefulness of the data valuation process, as well as provide little or no indication to an enterprise as to where content should be stored throughout the distributed information technology (IT) infrastructure of the enterprise.

SUMMARY

Embodiments of the invention provide automated content storage management techniques using multi-dimensional asset valuation models.

For example, in one embodiment, a method performed by one or more processing devices comprises the following steps. A set of valuations is obtained for a set of assets of a given enterprise. The enterprise has a plurality of groups associated therewith, and each of the valuations is computed using a multi-dimensional model configured to generate cross-group impact values with respect to each asset and two or more of the groups associated with the enterprise. One or more storage locations within a storage infrastructure associated with the enterprise to store the assets are determined based on the valuations for the assets.

In one or more illustrative embodiments, the one or more storage locations are determined based on a content balancing process that computes an optimal storage location to store each asset in order to minimize overall cost to the enterprise.

In one or more embodiments, each multi-dimensional model is in the form of a matrix data structure and the cross-group impact values are off-diagonal entries of the matrix data structure.

Advantageously, illustrative embodiments provide techniques for managing content storage (e.g., storage location decisions) based on valuations calculated from matrix representations of the assets.

These and other features and advantages of the invention will become more readily apparent from the accompanying drawings and the following detailed description.

BRIEF DESCRIPTION OF THE DRAWINGS

FIG. 8 illustrates a table comparing two independent valuation systems, according to an illustrative embodiment.

DETAILED DESCRIPTION

Figure 1:
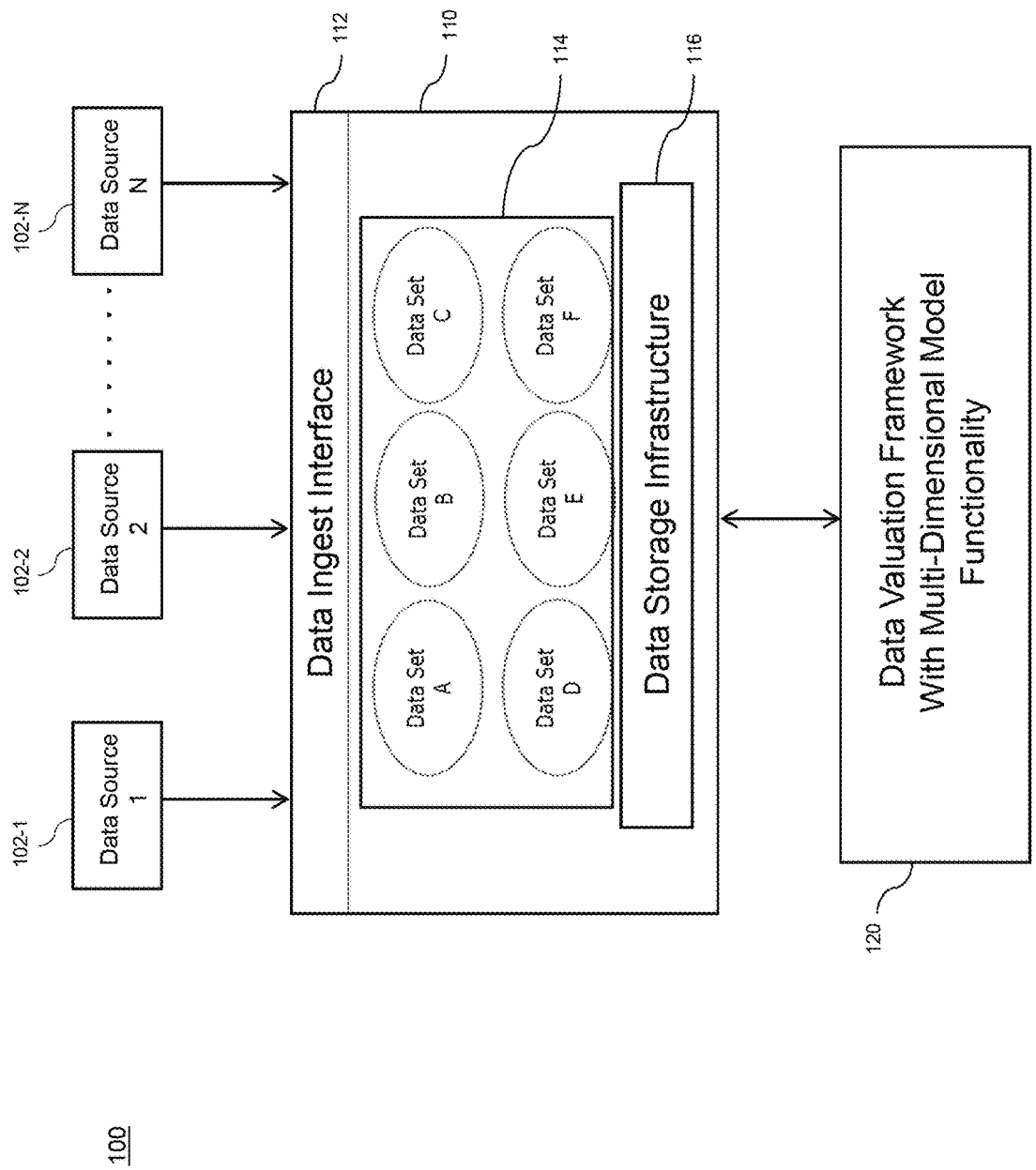
FIG. 1 illustrates a data storage system environment with a data valuation framework using multi-dimensional model functionality, according to an illustrative embodiment.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "information processing system," "computing system," "data storage system," "data lake," and the like as used herein are intended to be broadly construed so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"structured data" illustratively refers to data that resides in fixed fields within a document, record or file, e.g., data contained in relational databases and spreadsheets; and "unstructured data" illustratively refers to data that is not considered structured data (in which case, some "semi-structured" data asset may also be considered unstructured data), e.g., documents, free form text, images, etc.;

"metadata" illustratively refers to data that describes other data; and

"enterprise" illustratively refers to a business, a company, a venture, or the like.

It is to be appreciated that while illustrative embodiments describe asset valuation from the perspective of data sets, i.e., data valuation, other assets (e.g., applications, services, etc.) can be valued using these techniques.

As mentioned above in the background section, calculating the total value of a data set based on a single-value evaluation of the data set generates a single cost value. When considering various functional uses of data (e.g., backup, enterprise planning, discovery, etc.) or use by different organizations (within the enterprise or even multiple enterprises), it has been realized that such an approach inhibits an ability to treat each of these groups (e.g., functional uses, different organizations, etc.) separately. As a result, cross-enterprise costs are not accurately taken into account in existing single cost valuation approaches.

An approach to accurately consider such cross-enterprise costs has been proposed. For example, such an approach is described in U.S. patent application Ser. No. 15/669,523, entitled "Calculating Asset Value Using Multi-Dimensional Models" filed Aug. 4, 2017, the disclosure of which is incorporated by reference herein in its entirety. More particularly, the above-referenced U.S. Patent Application describes an approach whereby the value of a data asset is calculated by creating a cross-enterprise view of the data's value and cost. This view is expressed in the form of a multi-dimensional model, e.g., a matrix.

More particularly, the multi-dimensional model approach introduces matrix equations to model data value across, e.g., multiple enterprises, organizations, multiple functions, multiple locations, multiple individuals, etc. (which are more generally referred to herein as "groups"). These groups may, for example, represent different organizations or functions within an enterprise. However, the groups can also refer to different storage locations such as, for example, when data is stored in different clouds or different data centers. As mentioned above, modeling data value with a single-value equation does not capture the cost of communication and dependencies between groups within an enterprise. However, as will be further explained, illustrative embodiments use matrix equations to more accurately reflect these costs.

Casting valuation equations as matrix equations assists in capturing cross-group costs. A matrix is a rectangular array of numbers which, in illustrative embodiments, is used to represent a system of equations. Advantageously, existing single-value equations can be re-cast as matrices as follows.

A single-value equation can represent the data valuation to one organization as:

$$ax = \text{Value}$$

where a is a weighting factor and x is the valuing variable of interest. Value is the total value due to the valuing variable.

In contrast, a multi-dimensional or matrix equation for two groups in the organization, where the value to each of the two groups is completely independent, is as follows:

$$\begin{bmatrix} a_{11} & 0 \\ 0 & a_{22} \end{bmatrix} \begin{Bmatrix} x_1 \\ x_2 \end{Bmatrix} = \begin{Bmatrix} \text{Value}_1 \\ \text{Value}_2 \end{Bmatrix}$$

The weighting factors have essentially become coefficients in the matrix which when written as value equations for organizations 1 and 2 appear as follows:

$$a_{11}x_1 = \text{Value}_1 \quad \text{(Eq. 1)}$$

$$a_{22}x_2 = \text{Value}_2 \quad \text{(Eq. 2)}$$

Illustrative embodiments use off-diagonal entries to reflect inter-group impact.

In one example, assume that there is a cost for transferring or sharing data between organizations 1 and 2. Illustrative embodiments account for these costs with the off-diagonal entries $a_{12}$ and $a_{21}$ in the matrix below:

$$\begin{bmatrix} a_{11} & a_{12} \\ a_{21} & a_{22} \end{bmatrix} \begin{Bmatrix} x_1 \\ x_2 \end{Bmatrix} = \begin{Bmatrix} \text{Value}_1 \\ \text{Value}_2 \end{Bmatrix}$$

which when written out as value equations for the organizations becomes:

$$a_{11}x_1 + a_{12}x_2 = \text{Value}_1 \quad \text{(Eq. 3)}$$

$$a_{22}x_2 + a_{21}x_1 = \text{Value}_2 \quad \text{(Eq. 4)}$$

Note that entries $a_{12}$ and $a_{21}$ can essentially represent negative values that would therefore negatively impact the equation values for organization 1 and 2 shown above as Eq. 1 and Eq. 2, respectively.

In other words, for existing single-value models, the single value is offset by any associated cross-organizational cost.

For simplicity, the matrix equation can be written as:

$$A\bar{x} = \overline{\text{Value}}$$

where the bolded letter represents a matrix and all other values represent scalars.

As indicated above, the cost to a group (for example, an organization in the enterprise) is represented by a row in the matrix equation.

More particularly, the left-to-right diagonal ($a_{11}$ and $a_{22}$) may represent (positive) value to the organization that can directly access that data, while the right-to-left diagonal ($a_{12}$ and $a_{21}$) may represent the costs incurred in order for another organization to leverage value out of that data. By subtracting these costs from the aggregate value on the left-to-right axis, an overall valuation score is calculated.

The matrix can be arbitrarily large, so many different organizations and functions (i.e., groups) may be represented. Further, if two organizations experience different costs based on the direction (flow) of the data between organizations, these can be reflected by using non-symmetric matrices. By the term "non-symmetric matrix" as illustratively used herein (or asymmetric matrix), it is intended to describe the asymmetry in the costing that the matrices, according to illustrative embodiments, are able to reflect or capture.

Figure 2:
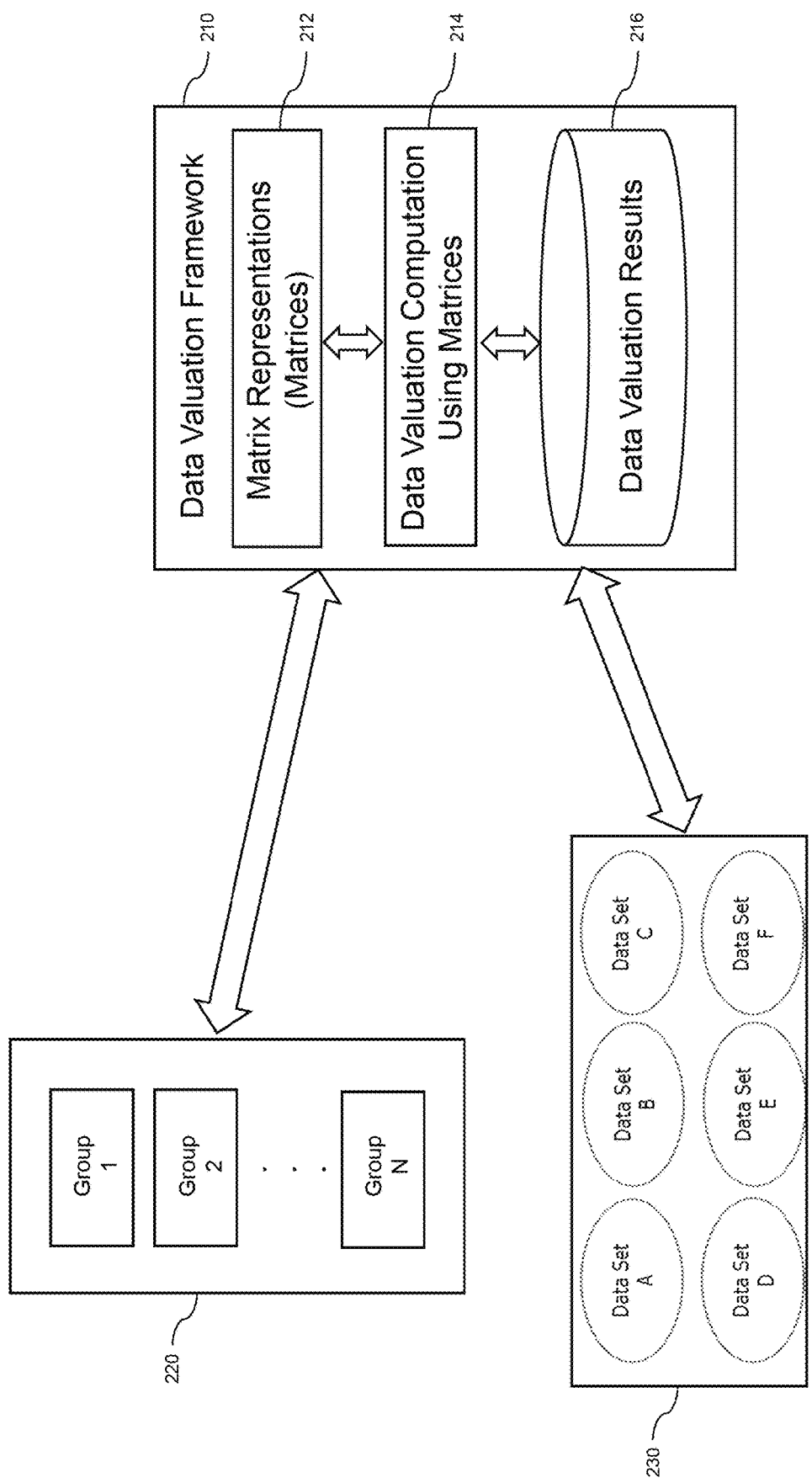
FIG. 2 illustrates a data valuation framework using multi-dimensional model functionality, according to an illustrative embodiment.
Figure 3:
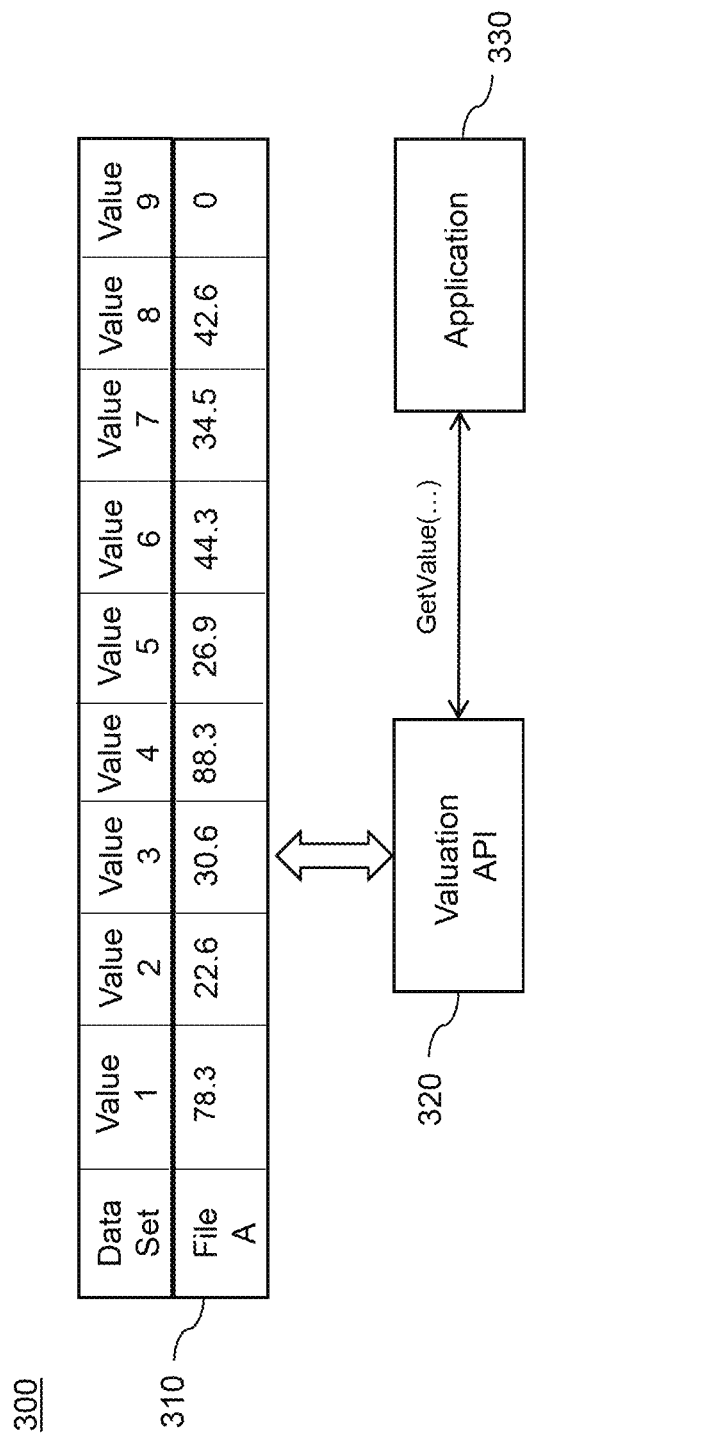
FIG. 3 illustrates an example of a data valuation table generated by a data valuation algorithm using multi-dimensional model functionality, according to an illustrative embodiment.

FIGS. 1-3 illustrate a system and methodology configured to calculate the value of a data asset by creating a cross-enterprise view of the data asset's value and cost using a multi-dimensional model configured to generate cross-group impact values with respect to the data asset and two or more of groups associated with the enterprise. Further details of these illustrative systems and methodologies are described in the above-referenced U.S. Patent Application. It is to be understood that alternative forms of valuation models may be used in other embodiments.

FIG. 1 illustrates a data storage system environment in which multi-dimensional model valuation can be implemented. As shown, in data storage system environment 100 (which may be implemented as a cloud computing platform in an illustrative embodiment), data sources 102-1, 102-2, . . . 102-N provide data to data storage system 110 through a data ingest interface 112. In illustrative embodiments, one or more of the data sources 102-1, 102-2, . . . 102-N may provide streaming data (i.e., data streams). However, one or more of the data sources 102-1, 102-2, . . . 102-N may also provide non-streaming data. The data storage system 110 comprises a plurality of data sets 114 (data sets A-F) that are stored on resources associated with data storage infrastructure 116. The data sets 114 comprise the data from the data sources 102 (e.g., data files), but can also include other data. The data sets 114 may each have their own domain-specific data (e.g., customer data, employment data, credit data, etc.) corresponding to one or more of data sources 102-1, 102-2, . . . 102-N.

Data storage infrastructure 116 may comprise resources such as one or more compute elements (e.g., servers), network elements (e.g., switches, routers), and storage elements (e.g., storage devices, storage arrays). Data storage system 110 can be part of one or more data centers managed by one or more service providers, one or more data centers privately managed by an enterprise, or some combination thereof. Also note that while data storage infrastructure 116 is illustrated as a single storage component in FIG. 1 within which data sets 114 are stored, it is to be understood that the data storage infrastructure 116 may be geographically distributed or otherwise distributed such that all the data sets 114 are duplicated on multiple storage infrastructure or the data sets 114 are separately distributed on multiple storage infrastructure.

The value of data, such as the data from data sources 102-1, 102-2, . . . 102-N stored as data sets 114, is calculated by data valuation framework 120. Illustrative embodiments calculate data valuation metrics for the data sets 114 utilizing the above-described multi-dimensional model (e.g., matrices) functionality. FIG. 2 shows further details of the data valuation framework 120.

More particularly, FIG. 2 illustrates a data valuation framework 210 using multi-dimensional model functionality. Framework 210 is an example of framework 120 shown in FIG. 1. As shown, data valuation framework 210 comprises matrix representations (matrices or matrix data structures) 212 which are used in data valuation computations 214 to generate data valuation results 216. Advantageously, as explained above, data valuation framework 210 takes into account the set of groups 220 (Group 1, Group 2, . . . Group N) when performing data valuation of data sets 230 (e.g., data sets A-F of FIG. 1). That is, the matrices 212 model data value for each of data sets 230 across multiple groups 220 (e.g., organizations, functions, storage locations, etc.). Then, data valuation computation 214 generates values using the corresponding matrix for a given data set that reflects the inter-group impact (i.e., cross-group impact values). The data valuation results 216 may be stored in a form that allows an administrator or other party or system to view the multiple dimensions of the value calculation for a data set for each group. For example, recall Eq. 3 above. As applied to the example in FIG. 2, $a_{11}x_1$ can reflect the value of Data Set A for Group 1, while $a_{12}x_1$ reflects the impact of Group 2 as it relates to Group 1 for Data Set A (i.e., a cross-group impact value or sub-computation). Each of these sub-computations ($a_{11}x_1$ and $a_{12}x_1$) can be stored as values in the data valuation results 216, as well as the total of these sub-components as a total value. Recall that Group 2 may have a negative impact on Data Set A as it relates to Group 1 and thus the second sub-computation $a_{12}x_1$ would be subtracted from the first sub-computation. However, alternatively, the impact could be positive and thus the sub-computations would be added. Nonetheless, when the impact is negative (e.g., $a_{12}$ is negative), the sub-computations can still be considered as being added (since adding a value with a negative coefficient is equivalent to subtracting).

In another illustrative embodiment, the coefficients $a_{ij}$ may be considered as constant (or at least more constant than the x values). Thus, in this embodiment, the system stores the coefficients $a_{ij}$ and then multiplies them with their corresponding x values and sums everything to get the different valuations. In one example, a computer instruction serves to multiply and sum coefficients and values in one iteration. Thus, the system stores the coefficients $a_{ij}$, feeds in x values, and the multiply and sum operation is performed to obtain the valuations.

In a further embodiment, the coefficients $a_{ij}$ may be considered as time-dependent over a longer period of time (e.g., months) as compared with the x values which can change from instant to instant. Thus, the coefficients $a_{ij}$ can be initially stored as constants, but then underlying tools for developing the coefficients can be re-executed (e.g., a valuation analysis, an analysis of latency of the network, etc.) on a periodic basis (e.g., monthly or quarterly schedule) in order to update the coefficients.

FIG. 3 illustrates an example 300 of a data valuation table generated by a data valuation algorithm using multi-dimensional model functionality. More particularly, data valuation table 310 may represent data valuation results 216 in FIG. 2 calculated for a given one of the data sets 230 including the above-described sub-computation values and total values.

As shown in example 300 in FIG. 3, a valuation table 310 represents a table stored for file A (i.e., a data set). Table 310 shows illustrative Values 1-9 which may represent results from different sub-computations (including cross-group impact values) from part of a matrix representation for file A. By way of example only, assume Value 1 is the computed data value for File A for Group 1 independent of the other groups, while Values 2-9 are the computed cross-group impact values from Groups 2-9, respectively, as these groups impact the independent value (Value 1) of File A for Group 1. As further shown, a valuation application programming interface (API) 320 can fetch any values for file A from table 310 based on a query from an application 330.

Examples of data valuation algorithms that may be employed to compute data valuation may comprise, but are not limited to:

(i) unstructured tokenization algorithms (UTA) described in U.S. patent application Ser. No. 14/863,783, filed Sep. 24, 2015, entitled "Unstructured Data Valuation," the disclosure of which is incorporated herein in its entirety;

(ii) application development and deployment velocity valuation algorithms described in U.S. patent application Ser. No. 14/998,112, filed Dec. 24, 2015, entitled "Data Valuation Based on Development and Deployment Velocity," the disclosure of which is incorporated herein in its entirety;

(iii) data ingest valuation algorithms described in U.S. patent application Ser. No. 15/135,790, filed Apr. 22, 2016, entitled "Data Valuation at Content Ingest," the disclosure of which is incorporated herein in its entirety;

(iv) data value tree generation techniques described in U.S. patent application Ser. No. 15/135,817, filed Apr. 22, 2016, entitled "Data Value Structures," the disclosure of which is incorporated herein in its entirety; and (v) valuation algorithms based on analysis of a backup and recovery ecosystem described in U.S. patent application Ser. No. 15/136,327, filed Apr. 22, 2016, entitled "Calculating Data Value via Data Protection Analytics," the disclosure of which is incorporated herein in its entirety.

By way of another non-limiting example, one or more of the data valuation models described in D. Laney, "The Economics of Information Assets," The Center for Infonomics, Smarter Companies presentation, September 2011, may be employed as data valuation algorithms. Such valuation models include a set of non-financial models and set of financial models. As shown, the non-financial models include: (i) an intrinsic value of information model, which represents a measure of a value of the correctness, completeness, and exclusivity (scarcity) of the data set; (ii) a business value of information model, which represents a measure of a value of the sufficiency and relevance of the data set for specific purposes; and (iii) a performance value of information model, which represents a measure of a value of how the data set affects key business drivers. The financial models include: (i) a cost value of information model, which represents a measure of a value of the cost of losing the data set; (ii) a market value of information model, which represents a measure of a value of the amount that could be obtained by selling or trading the data set; and (iii) an economic value of information model, which represents a measure of a value of how the data set contributes to a financial bottom line.

It is to be appreciated that the above valuation processes are intended to be examples only, and thus other valuation algorithms and techniques can be used in alternative embodiments. Furthermore, while such valuation processes may be applied to data sets associated with the organization, the valuation techniques can also be applied to other assets related to data of the organization including, but not limited to, applications, services, etc.

Figure 4:
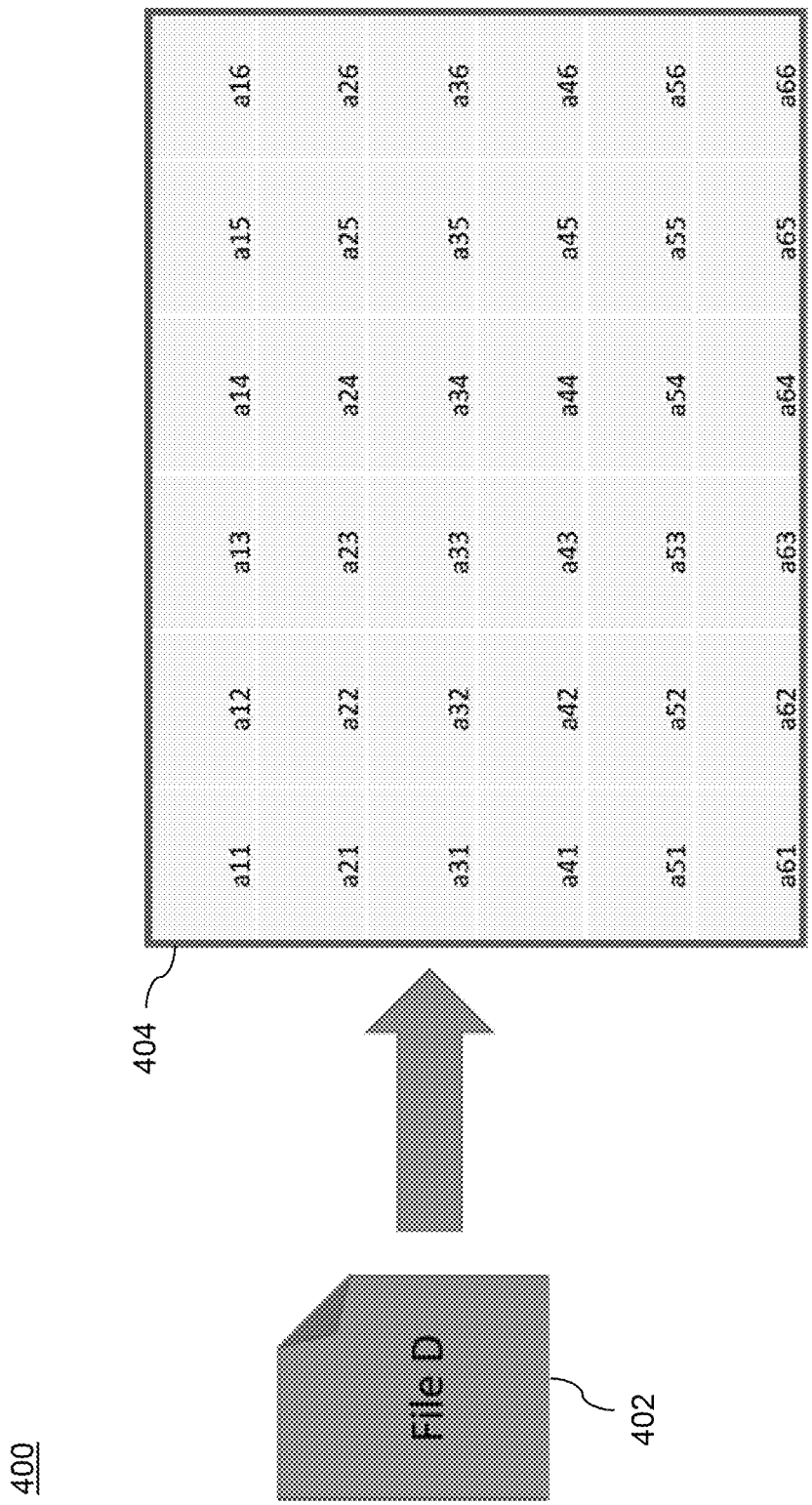
FIG. 4 illustrates an example of a file valuation represented in a multi-dimensional model form, according to an illustrative embodiment.

Turning now to FIG. 4, an example 400 is shown of a file valuation represented in multi-dimensional model form. More particularly, FIG. 4 shows that for any given data set 402 (File D), the value of the data set 402 can be expressed as a matrix 404 (computed as illustratively explained above in the context of FIGS. 1-3) which takes into account cross-organizational costs.

It is to be appreciated that the size of such a matrix (e.g., matrix 404) is essentially tied to the number of organizations within a company. For example, a large company, e.g., Company 1, may have multiple companies (e.g., subsidiaries or otherwise) organizationally beneath it, Sub-Company 1, Sub-Company 2, . . . , Sub-Company N. Furthermore, within each sub-company there may be a certain number of departments. Advantageously, all of these organizations (e.g., sub-companies, sub-departments, etc.) can be modeled within a relatively small matrix. Such data valuation-based multi-dimensional model functionality enables modeling massive amounts of data assets (e.g., files, databases, objects, etc.) with such valuation matrices. It is to be appreciated that the data valuation calculations (e.g., 214 in FIG. 2) are made from the matrix representations (e.g., 404 in FIG. 4) as explained above.

Figure 5:
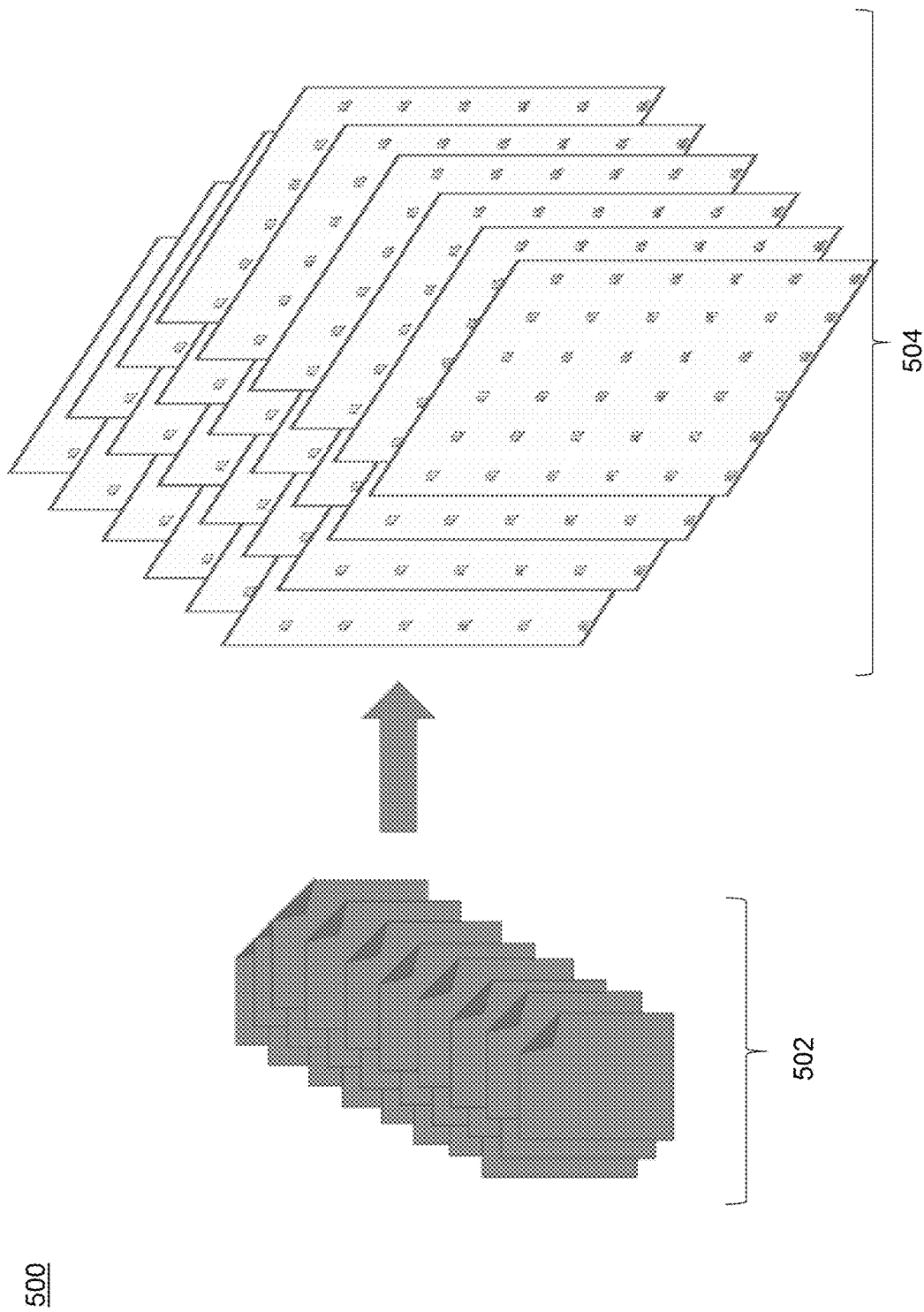
FIG. 5 illustrates an example of a data portfolio modeled as a plurality of multi-dimensional models representing valuations for data assets, according to an illustrative embodiment.

FIG. 5 illustrates this functionality in example 500 as a data portfolio (a plurality of data assets) 502 modeled as a set of matrices (a plurality of multi-dimensional models) 504 representing valuations for the data assets of portfolio 502. These matrices 504 can solve a set of difficult problems experienced by large organizations that wish to optimize the business value of their data assets.

Before describing illustrative embodiments utilizing the plurality of matrices computed as described above, examples of some of these problems are described below. It is realized that a large variety of techniques can be employed to calculate data's value. The problems listed below, however, not only hinder valuation but can also obscure data placement decisions (where in the IT infrastructure (e.g., data storage infrastructure 116) of the enterprise or company should specific content be stored) that could otherwise result in overall increased business value from data.

Cross-organizational blockages. Some organizations are unable to extract value from cross-organizational assets (e.g., Sub-Company 2 cannot access data assets internal to Company 1). There are currently no models for expressing this situation.

Multi-channel data sharing. There are currently no models considering the costs for a variety of data sharing techniques (e.g., email, file transfer protocol, replication, etc.) that could be implemented within an enterprise.

High-value, low-cost placement options. There is currently no method for determining, for a given data asset, if a repositioning of that data asset within the enterprise, at a given cost, would provide a higher-value result than leaving the given data asset at its current storage location.

Heat maps for under-valued content. There are currently no methods for highlighting high-potential, under-valued data assets that are currently stored in "cold" locations. Similarly, there are currently no heat maps to highlight which data assets are currently stored in their optimal or near optimal locations. As used herein, a "heat map" is a visual representation of data in which data values are represented as colors or shades. When all assets are in their proper (i.e., optimal or near optimal) location, the content is said to be "balanced" from a valuation perspective. No current mechanisms can provide such content balancing.

Data movement graphs for under-valued data assets. There are currently no graphical tools for highlighting which data assets should be moved to which new location to maximize the data's value. It is realized herein that such graphs could be used to enable a request for manual approval from a system operator, as opposed to automatically moving the content. However, automatic data migration may be employed.

Grouping data assets and modeling potential moves. Dealing with individual data assets may be too granular for many enterprises. However, there is currently no way to model the impact of moving "groups" of data assets in order to understand the potential value of this movement.

Multiple costing. Costing is often associated with currency (e.g., dollars). There are other ways to express "cost" (e.g., slower latency). However, there is no current way to model these other forms of value (either in singular form or as multiple values).

Illustrative embodiments overcome the above and other challenges associated with existing approaches. More particularly, illustrative embodiments provide a content storage management framework using data valuation-based multidimensional models (e.g., matrices) to balance content storage, according to an illustrative embodiment. It is to be understood that balancing content storage can be performed for any set of storage locations under consideration. Storage locations may be any type of computing resource of a given network (e.g., wide area network, local area network, combinations thereof, etc.). Such computing resources may include, but are not limited to, cloud platforms, data centers, employee devices, customer devices, edge devices, gateways, and endpoint devices such as Internet of Things (IoT) devices (collectively referred to as an "extended multi-cloud environment").

Figure 6:
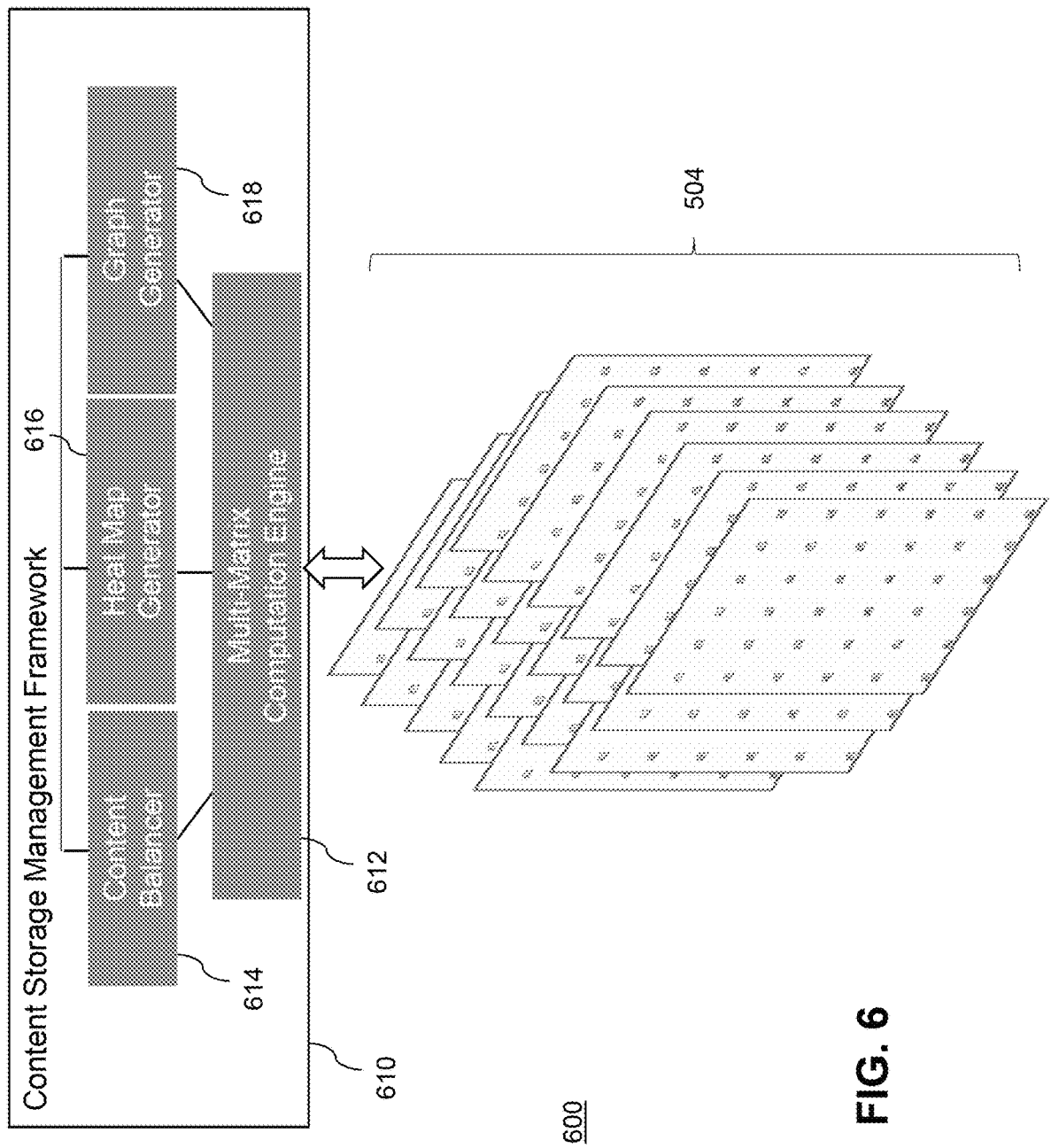
FIG. 6 illustrates a content storage management framework using data valuation-based multi-dimensional models to balance content storage, according to an illustrative embodiment.

FIG. 6 illustrates an information processing environment 600 with a content storage management framework 610 that is operatively coupled to a repository in which a plurality of matrices 504 (recall FIG. 5) are stored and accessible. The framework 610 is configured to balance content across an enterprise for maximum value (minimal cost). As will be explained in further detail below, the framework 610 comprises a multi-matrix computation engine 612, a content balancer 614, a heat map generator 616, and a graph generator 618, all operatively coupled to one another. It is to be appreciated that in one or more embodiments, the framework 610 may be integrated as part of the data valuation framework 120 (FIG. 1). However, in one or more alternative embodiments, framework 610 may be implemented as a standalone functionality. Still further, some combination of partially integrated and partially standalone implementations may be realized.

Multi-matrix computation engine 612 allows each data asset to be treated separately. It is to be appreciated that a data asset can be any data item to be evaluated. By way of example only, one or more files, one or more directories, or groups of one or more directories and one or more files that are enumerated by some data set can each have a valuation matrix associated therewith. Thus, the plurality of matrices 504 represents the respective matrices for the data assets (e.g., data portfolio 502) under consideration.

In one or more illustrative embodiments, it is assumed that each data asset is valuated using the method described above in the context of FIGS. 1-3 to generate a data value matrix for each data set.

The data value matrix associated with one atomic data asset is able to be combined with one or more other data value matrices of one or more other atomic data assets to create a data value matrix for the composite data asset. For example, given the data value matrix for every file in a directory, a data value matrix for the directory is created by combining the matrices corresponding to the files in the directory.

One illustrative embodiment, implemented in computation engine 612, for valuating a composite matrix $M_c$ comprises a linear combination:

$$M_c = \sum_i c_i f(r_i) M_i$$

where $M_i$ is the value matrix for the ith atomic asset, $f(r_i)$ is a function of the storage protection features for the resource storing that asset, e.g., storage size, computational and networking resource cost, etc., and $c_i$ is a scalar weighting coefficient which acts to bias the composite matrix. It is to be understood that $c_i$ can be used to bias an atomic piece of data based on a perceived greater business value. In one or more illustrative embodiments, in order to maintain the same scale of the value matrices, an additional constraint is introduced. More specifically, the constraint is that $\Sigma_i c_i f(r_i)=1$. This constraint may be achieved, in one example, by adjusting the scalar weighting coefficients $c_i$ appropriately.

Note that a "resource" as illustratively used herein refers to a data storage infrastructure resource such as, but not limited to, one or more storage devices, one or more storage arrays, one or more cloud platforms, one or more data centers, etc. Such storage resources, in one or more embodiments, can be part of a data protection ecosystem. The term "data protection ecosystem" illustratively refers to a system (e.g., comprising devices, subsystems, tools, algorithms, policies, schedules, mappings, catalogs, backup data, etc.) that protects data. By way of example, the data that is being protected may be part of a "production environment" or "primary storage environment," i.e., a data storage environment where data is accessible online by one or more clients. Backup data, metadata, and analytics results are obtained during the course of the data protection ecosystem providing data backup and recovery functionalities for the primary storage environment.

Given multi-matrix computations and value matrix composition by atomic and composite data sets, as explained above, a natural extension is to consider multi-level policies. That is, how do we treat atomic data versus multiple levels of composite data? For example, in general, one may choose to protect a directory of files on some given storage protection resource. However, perhaps one file in that directory has access patterns, business value, or other considerations that would qualify it to be protected by some other storage resource.

Such an approach requires consideration of policies, that is, policies must now handle data protection at different data granularities, rank the sub-policies, and choose the best storage resource accordingly. Furthermore, the metadata for the data must exist in a global location such as a local cloud so that data can be retrieved from the proper storage resource.

It is to be noted that these equations often indicate that the optimal solution is to store some data at one location (having one or more storage resources) and some at another location (having one or more other storage resources). While indeed this is possible and perhaps even desirable to truly optimize cost and value of data, it might not always be practical. For example, if an atomic asset (for example, a file) was to be optimally stored at multiple locations, this raises a question as to how the asset would be divided.

For that reason, in one or more embodiments, these valuation results are treated through a ranking system when considering atomic data assets. Thus, for example, the location that achieves the highest value (e.g., the most bytes) is the optimal location to store the complete atomic asset.

Dividing data sets into atomic assets and building composites allows the construction of a data protection environment where multiple storage resources can be used to optimally store the composite data sets. Consider a file that is very "hot," meaning, for example, that it is being accessed by many different parties and/or relatively frequently. Perhaps the most active party accessing the file is in location B, but the data storage on the directory is at location A. In that case, the desirable prioritization for storage is to store the primary and protection copies at location B while storing the rest of the data in the directory at location A.

Content balancer 614 is configured to solve a cost optimization problem that take into account the above considerations. Multi-level policies based on multi-matrix mathematics provide the mathematical structure by which the cost optimization problem can be solved. That is, a goal of the content balancer 614 is to find the minimal cost for storing the data that maximizes protection and access under the multi-level policy.

The storage location of any data is determined by the optimization process. In one or more embodiments, the content balancer 614 is an application that tracks the storage location of the data, notes when it differs from the optimal storage location, and moves it as/when appropriate to the new optimal storage protection resource. It should be noted that the content balancer 614 preferably attempts to move data from storage resource to storage resource in a way that does not overwhelm the data protection system. That is, data should not be moved during peak business hours, but perhaps during the backup process. Also, in one or more embodiments, a stickiness factor is used such that data does not hop back and forth between storage resources due to sensitivity to access patterns, but rather the adjustable stickiness factor is used to maintain the data in place until it is clear that it should be moved.

Heat map generator 616 is configured to generate heat maps for use as a visualization tool for considering several different aspects in optimal data protection visualization. Typically, the desire is to display areas of concern due to increased protection costs.

One embodiment displays data which is currently not stored in an optimal location. An administrator or privileged user can start with a heat map (generated by generator 616) of all assets and interactively explore hot areas down to the lowest integral data asset. This allows the administrator or privileged user to select the data for immediate rebalancing.

Graph generator 618 is configured to convert any matrix into a graph that shows the relative value of the data among the organizations using the data and the ease (cost) of moving that data between organizations' primary and/or data protection resources. Thus, in coordination with a one or more heat maps generated by the heat map generator 616, the graph generator 618 gives an administrator or privileged user capabilities to manage critical data in a way which is not currently available.

Figure 7:
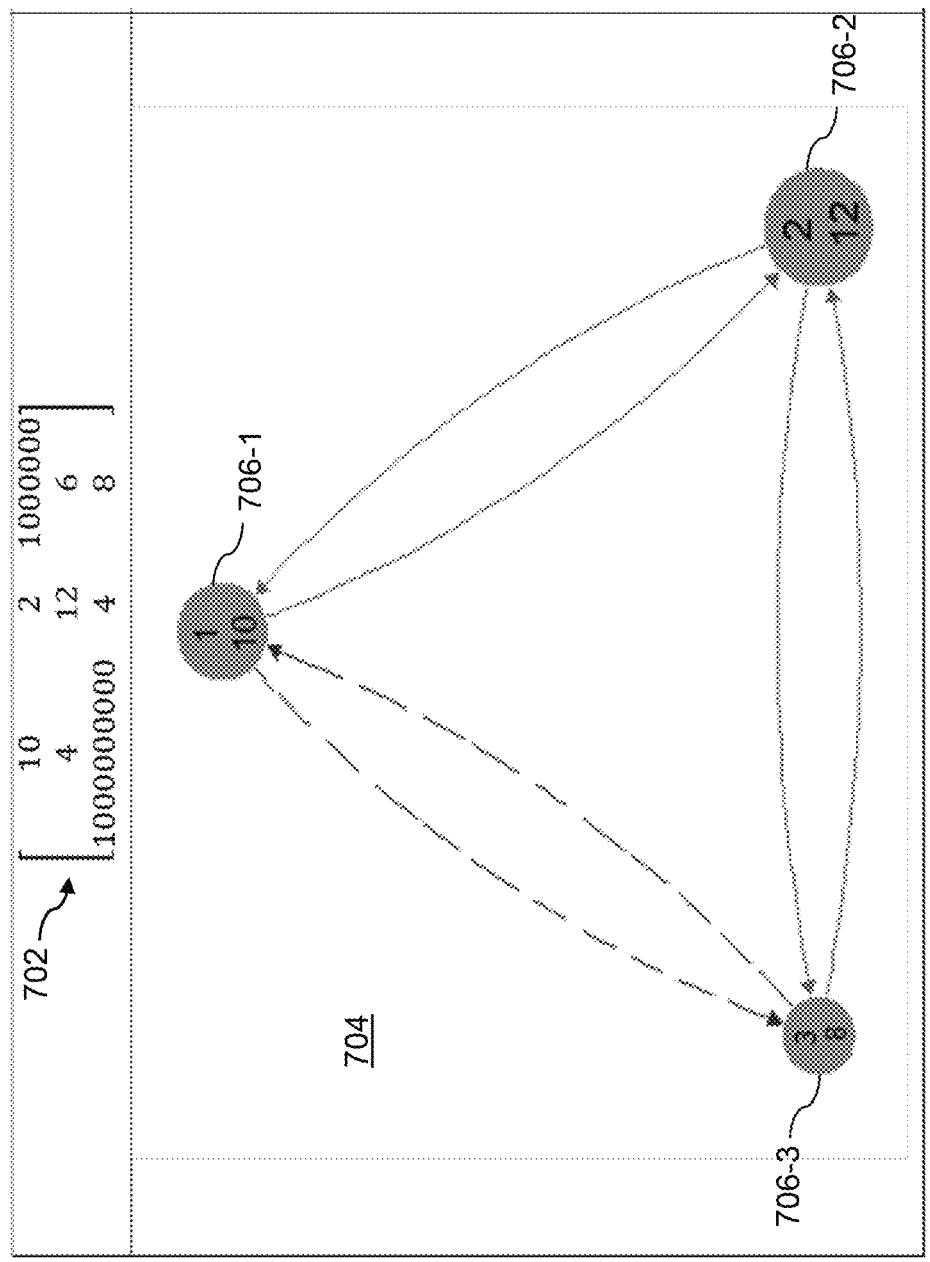
FIG. 7 illustrates a multi-dimensional model represented as a graphical data structure, according to an illustrative embodiment.

FIG. 7 illustrates a presentation 700 generated by the graph generator 618. More particularly, a data value (cost) matrix 702 is visualized as a graph 704. Note that the three values (10, 12, 8) in the left-to-right diagonal for groups 1, 2, 3 in matrix 702 are represented as nodes 1, 2, 3 (706-1, 706-2, 706-3). The matrix 702 also indicates via the right-to-left off diagonal that the data paths between groups 1 and 3 are very expensive (i.e., $10^8$). In graph 704, the tremendous cost burden of those paths is illustrated by the set of dashed lines between nodes 1 and 3, as compared with the respective sets of solid lines between nodes 1 and 2, and nodes 2 and 3, which indicate significantly less relative cost.

Blocked organizations are those that are not visible from a given organization. For example, within a conglomerate, different companies may not share a common data protection network. Even within the same enterprise, there are both technology and corporate security walls that prevent data from being readily passed from organization to organization. In that case, data is "blocked," i.e., it can only be shared via (insecure) methods such as email, etc.

Recall again that off-diagonal matrix entities represent the cost of transferring data. When data paths between organizations are blocked, the cost to move data becomes very large, specifically, orders of magnitude greater than costs of open pathways. This specific case is demonstrated in FIG. 7 where the graph 704 illustrates (based on the corresponding matrix 702) the data pathway is effectively blocked between groups 1 and 3.

It is to be appreciated that there are multiple methods to valuate data. These methods are independent of each other. Consider two valuation systems 1 and 2 with different valuation matrices $A_1$ and $A_2$ which are both n×n matrices for n different storage locations. The optimization method designating where to store the data can be executed by content balancer 614 to simultaneously solve both independent equations in closed form.

The valuation systems 1 and 2 are completely independent. As such, it is possible that such valuation systems may have contradictive indications as to where to store the data. The negative amount for location 2 using valuation system 2 indicates strongly that data should not be stored at that location though valuation system 1 indicates that is the best location. Such an example is given in FIG. 8 as table 800. Mathematical details of the evaluation are further described below. Illustrative embodiments use a linear equation written to combine the independent results for an overall cost, as well as allow for the fact that it may not be possible to find the proper valuation method. As such, the linear equation uses one or more statistical measures to determine how to combine the two equations, that is, how each valuation should be weighed against the total real cost. This weighting is further described below.

The following describes in illustrative detail the mathematics and uses code (written in R) to demonstrate the mathematical concepts giving a simple proof-of-concept for the techniques described above. It is to be appreciated that the mathematics and code are purely illustrative and not intended to limit the scope of any of the embodiments. It is demonstrated how to constrain and optimize costs for the complete enterprise.

Background and Notation

This problem can be solved closed-form as a constrained least squares problem, e.g., see L. Vandenberghe, "Constrained Least Squares" UCLA Lecture Notes, EE133A, 11-1 through 11-35 (Spring 2017), the disclosure of which is incorporated by reference in its entirety herein. The constrained least squares problem is written as:

$$\text{minimize} \|Ax-b\|^2$$

$$\text{subject to } Cx=d$$

Following this notation, the matrices and vectors are defined as follow:
- A—The n×n asymmetric costing matrix. The unit of the entries is value units per byte.
- x—An n×1 matrix (vector) of the amount of data to distribute per group. The units are in bytes.
- b—The n×1 matrix (vector) of costs per group. The units are in value units.
- C—The 1×n constraint array (vector). The entries are unitless.
- d—A 1×1 dimensioned array (scalar) which is the total amount of data to be stored. The units are bytes.

Assigning Values into the Costing Matrix

As explained above, the diagonal values of the costing matrix represent the value of the data to each of the organizations. While the off-diagonal values are considered the cost of transferring data from group to group, it should be noted that those numerical values must be accounted for by the organization and are signed as positive values even though they are a sunk cost (cost that has been incurred and can not be recovered). Mathematically, this means that the costing matrix will be a non-symmetric non-negative matrix.
Solution An objective is to minimize the cost matrix b. Since this value is not known, this value is set to zero, e.g., $b=[0, 0, 0, \ldots, 0]^T$. The vector C is a vector of ones for solving a single equation. Consider an enterprise with only two groups with the following assigned values:
A←matrix(c(10, 4, 6, 8), nrow=2)
C←matrix(c(1,1), nrow=1)
b←matrix(c(0,0), nrow=2)
One gigabyte total data for demo purposes
GB←1000000000
d←matrix(c(GB), nrow=1)
print(A)

| ## |      | [,1] | [,2] |
|----|------|------|------|
| ## | [1,] | 10   | 6    |
| ## | [2,] | 4    | 8    | print(C)

| ## |      | [,1] | [,2] |
|----|------|------|------|
| ## | [1,] | 1    | 1    | print(b)

| ## |      | [,1] |
|----|------|------|
| ## | [1,] | 0    |
| ## | [2,] | 0    | print(d)

| ## |      | [,1]  |
|----|------|-------|
| ## | [1,] | 1e +09 |

The optimality condition is given as:

$$\begin{bmatrix} A^T A & C^T \\ C & 0 \end{bmatrix} \begin{bmatrix} \hat{x} \\ z \end{bmatrix} = \begin{bmatrix} A^T b \\ d \end{bmatrix}$$

For simplicity, the matrix is inverted:

$$\begin{bmatrix} A^T A & C^T \\ C & 0 \end{bmatrix}$$

and then the following is used to premultiply:

$$\begin{bmatrix} A^T b \\ d \end{bmatrix}$$

to solve for $\hat{x}$ and z.
results←matlib::inv(rbind(cbind(t(A) %*% A, t(C)), cbind (C, 0))) %*% rbind(t(A) %*% b, d) print(results)

| ## |      | [,1]    |
|----|------|---------|
| ## | [1,] | 2.5e+08 |
| ## | [2,] | 7.5e+08 |
| ## | [3,] | -9.8e+10 |

The amount to store is in the first two entries ($\hat{x}$) of the results:
Data Stored by Group 1
print(results[1,1])
[1] 2.5e+08
Data Stored by Group 2
print(results[2,1])
[1] 7.5e+08
The results can be checked by insuring that the sum to store for each group is equal to the total amount (d).
abs(results[1,1]+results[2,1]−d[1,1])<GB/10000
[1] TRUE
The answer indicates that more data should be stored on the resource associated with group 2. For atomic data, the choice is made to store the complete data set with group 2.
Multiple Value Measures It is apparent that there can be multiple ways to valuate data. Each of these different valuation matrices will have a different valuation matrix $A_1$, $A_2$, etc. and should act independently of each other.
The problem is still written as:

$$\text{minimize} \|Ax-b\|^2$$

subject to $Cx=d$ but the matrix A is formulated as follows for m different value measures:

$$\begin{bmatrix} A_1 & 0 & \ldots & 0 \\ 0 & A_2 & \ldots & 0 \\ \vdots & \vdots & \ddots & \vdots \\ 0 & 0 & \ldots & A_m \end{bmatrix}$$

where each $A_i$, 1, ..., m are an n×n asymmetric valuation matrices. The 0 entries are n×n matrices of zeros.
Now:
 A—The m*n×m*n asymmetric valuation matrix. The units are cost.
 x—An m*n×1 matrix (vector) of the of m*n data to distribute per group. The units are in bytes.
 b—The m*n×1 matrix (vector) of costs per group. The units are cost.
 C—The 1×m*n constraint array (vector). The entries are unitless.
 d—A 1×1 dimensioned array (scalar) which is the total amount of data to be stored. The units are bytes.
Consider two data measures, $A_1$
A1←matrix(c(10,4,1000000000,2,12,4,1000000,6,8), nrow=3)
print(A1)

| ## |      | [,1]  | [,2] | [,3]  |
|----|------|-------|------|-------|
| ## | [1,] | 1e+01 | 2    | 1e+06 |
| ## | [2,] | 4e+00 | 12   | 6e+00 |
| ## | [3,] | 1e+09 | 4    | 8e+00 | and A$_2$
A2←matrix(c(209, 101, 8, 342, 812, 79, 88, 453, 4), nrow=3)
print(A2)

| ## | | [,1] | [,2] | [,3] |
|---|---|---|---|---|
| ## | [1,] | 209 | 342 | 88 |
| ## | [2,] | 101 | 812 | 453 |
| ## | [3,] | 8 | 79 | 4 | and define a 3×3 zeros matrix
Zero←matrix(c(0,0,0,0,0,0,0,0,0), nrow=3)
print(Zero)

| ## | | [,1] | [,2] | [,3] |
|---|---|---|---|---|
| ## | [1,] | 0 | 0 | 0 |
| ## | [2,] | 0 | 0 | 0 |
| ## | [3,] | 0 | 0 | 0 |

A is the composition as given above:
A=rbind(cbind(A1,Zero), cbind(Zero,A2))
C←matrix(c(1,0,1,0,1,0,0,1,0,1,0,1), nrow=2)

b←matrix(c(0,0,0,0,0,0), nrow=6)
One terabyte total data for demo purposes
TB←1000000000000
d←matrix(c(TB,TB), nrow=2)
print(A)

| ## | | [,1] | [,2] | [,3] | [,4] | [,5] | [,6] |
|---|---|---|---|---|---|---|---|
| ## | [1,] | 1e+01 | 2 | 1e+06 | 0 | 0 | 0 |
| ## | [2,] | 4e+00 | 12 | 6e+00 | 0 | 0 | 0 |
| ## | [3,] | 1e+09 | 4 | 8e+00 | 0 | 0 | 0 |
| ## | [4,] | 0e+00 | 0 | 0e+00 | 209 | 342 | 88 |
| ## | [5,] | 0e+00 | 0 | 0e+00 | 101 | 812 | 453 |
| ## | [6,] | 0e+00 | 0 | 0e+00 | 8 | 79 | 4 | print(C)

| ## | | [,1] | [,2] | [,3] | [,4] | [,5] | [,6] |
|---|---|---|---|---|---|---|---|
| ## | [1,] | 1 | 1 | 1 | 0 | 0 | 0 |
| ## | [2,] | 0 | 0 | 0 | 1 | 1 | 1 | print(b)

| ## | | [,1] |
|---|---|---|
| ## | [1,] | 0 |
| ## | [2,] | 0 |
| ## | [3,] | 0 |
| ## | [4,] | 0 |
| ## | [5,] | 0 |
| ## | [6,] | 0 | print(d)

| ## | | [,1] |
|---|---|---|
| ## | [1,] | 1e+12 |
| ## | [2,] | 1e+12 |

Solve as before.
lhs_1←rbind(cbind(t(A) %*% A, t(C)),
    cbind(C, matrix(c(0,0,0,0), nrow=2)))
print(lhs_1)

| ## | | [,1] | [,2] | [,3] | [,4] | [,5] | [,6] | [,7] | [,8] |
|---|---|---|---|---|---|---|---|---|---|
| ## | [1,] | 1.00e+18 | 4000000068 | 8.010000e+09 | 0 | 0 | 0 | 1 | 0 |
| ## | [2,] | 4.00e+09 | 164 | 2.000104e+06 | 0 | 0 | 0 | 1 | 0 |
| ## | [3,] | 8.01e+09 | 2000104 | 1.000000e+12 | 0 | 0 | 0 | 1 | 0 |
| ## | [4,] | 0.00e+00 | 0 | 0.000000e+00 | 53946 | 154122 | 64177 | 0 | 1 |
| ## | [5,] | 0.00e+00 | 0 | 0.000000e+00 | 154122 | 782549 | 398248 | 0 | 1 |
| ## | [6,] | 0.00e+00 | 0 | 0.000000e+00 | 64177 | 398248 | 212969 | 0 | 1 |
| ## | [7,] | 1.00e+00 | 1 | 1.000000e+00 | 0 | 0 | 0 | 0 | 0 |
| ## | [8,] | 0.00e+00 | 0 | 0.000000e+00 | 1 | 1 | 1 | 0 | 0 | results←matlib::inv(lhs_1) %*% rbind(t(A) %*% b, d)
print(results)

| ## | | [,1] |
|---|---|---|
| ## | [1,] | 0.000000e+00 |
| ## | [2,] | 1.000002e+12 |
| ## | [3,] | 0.000000e+00 |
| ## | [4,] | 6.463338e+11 |
| ## | [5,] | −6.213455e+11 |
| ## | [6,] | 9.750117e+11 |
| ## | [7,] | −1.440003e+14 |
| ## | [8,] | −1.677441e+15 |

Now there is a result set for each of the two different valuation methods. For valuation method 1 corresponding to matrix A$_1$:
Data Stored by Group 1
print(results[1,1])
[1] 0
Data Stored by Group 2
print(results[2,1])
[1] 1.000002e+12
Data Stored by Group 3
print(results[3,1])
[1] 0
and for valuation method 2 corresponding to matrix A$_2$:
Data Stored by Group 1
print(results[4,1])
[1] 646333750000
Data Stored by Group 2

```
print(results[5,1])
[1]-621345470000
# Data Stored by Group 3
print(results[6,1])
[1] 975011720000
```
The results of each of the two different methods can be checked by checking that both methods sum to one terabyte:
```
print(results[1,1]+results[2,1]+results[3,1])
[1] 1.000002e+12
print(results[4,1]+results[5,1]+results[6,1])
[1] 1e+12
```
From the above results, it is clear that the enterprise should be storing all the data at location 2 when valuating with method 1. But method 2 gives a result that indicates a negative amount of data should be stored at location 2. It is evident that this is the strongest recommendation against storing data at location 2 as it is negative. The two valuation methods give contradicting indications of where to store the data since method 1 gives the greatest possible positive value and method 2 gives a negative answer. Advantageously, content balancer 614 provides an administrator or privileged user with these results and recommendations. The framework 610 can be set up to automatically move data based on these recommendations, or a manual approval step can be employed to obtain administrator or privileged user approval prior to moving the data.

Figure 9:
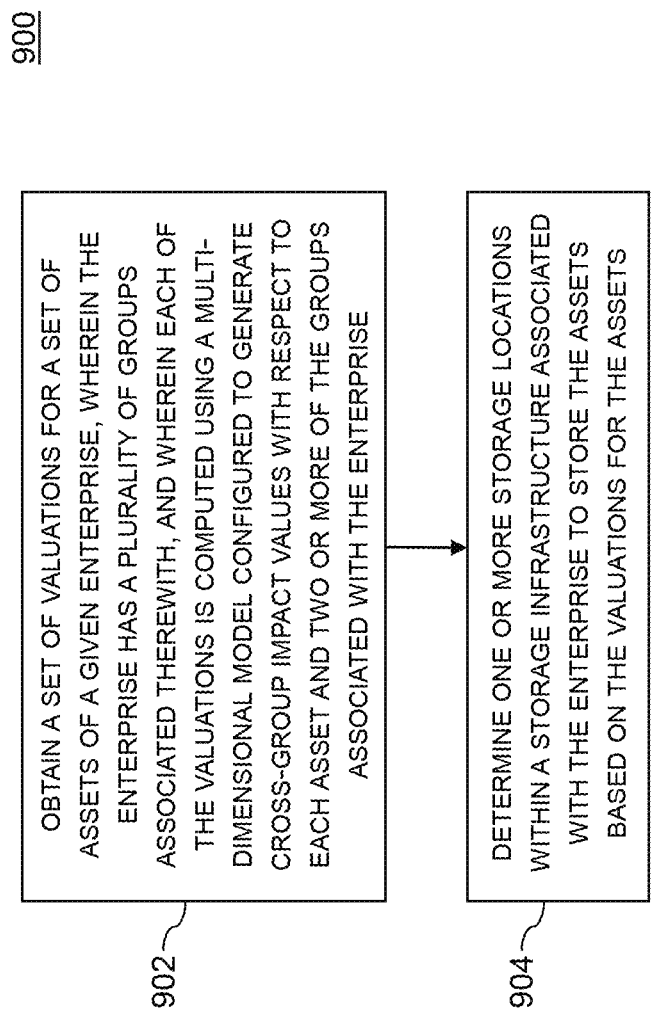
FIG. 9 illustrates a content storage management methodology using data valuation-based multi-dimensional models to balance content storage, according to an illustrative embodiment.

FIG. 9 illustrates a content storage management methodology 900 using data valuation-based multi-dimensional models to balance content storage, according to an illustrative embodiment.

Step 902 obtains a set of valuations for a set of assets of a given enterprise, wherein the enterprise has a plurality of groups associated therewith, and wherein each of the valuations is computed using a multi-dimensional model configured to generate cross-group impact values with respect to each asset and two or more of the groups associated with the enterprise.

Step 904 determines one or more storage locations within a storage infrastructure associated with the enterprise to store the assets based on the valuations for the assets. As described herein, in one or more illustrative embodiments, the one or more storage locations are determined based on a content balancing process that computes an optimal storage location to store each asset in order to minimize overall cost to the enterprise.

At least portions of the data valuation and content storage management frameworks using multi-dimensional model functionality shown in FIGS. 1-9 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the data valuation and content storage management frameworks shown in FIGS. 1-9 may each run on a computer, server, storage device or other processing platform element. A given such element may be viewed as an example of what is more generally referred to herein as a "processing device." An example of such a processing platform is processing platform 1000 shown in FIG. 10.

The processing platform 1000 in this embodiment comprises a plurality of processing devices, denoted 1002-1, 1002-2, 1002-3, . . . 1002-N, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 10:
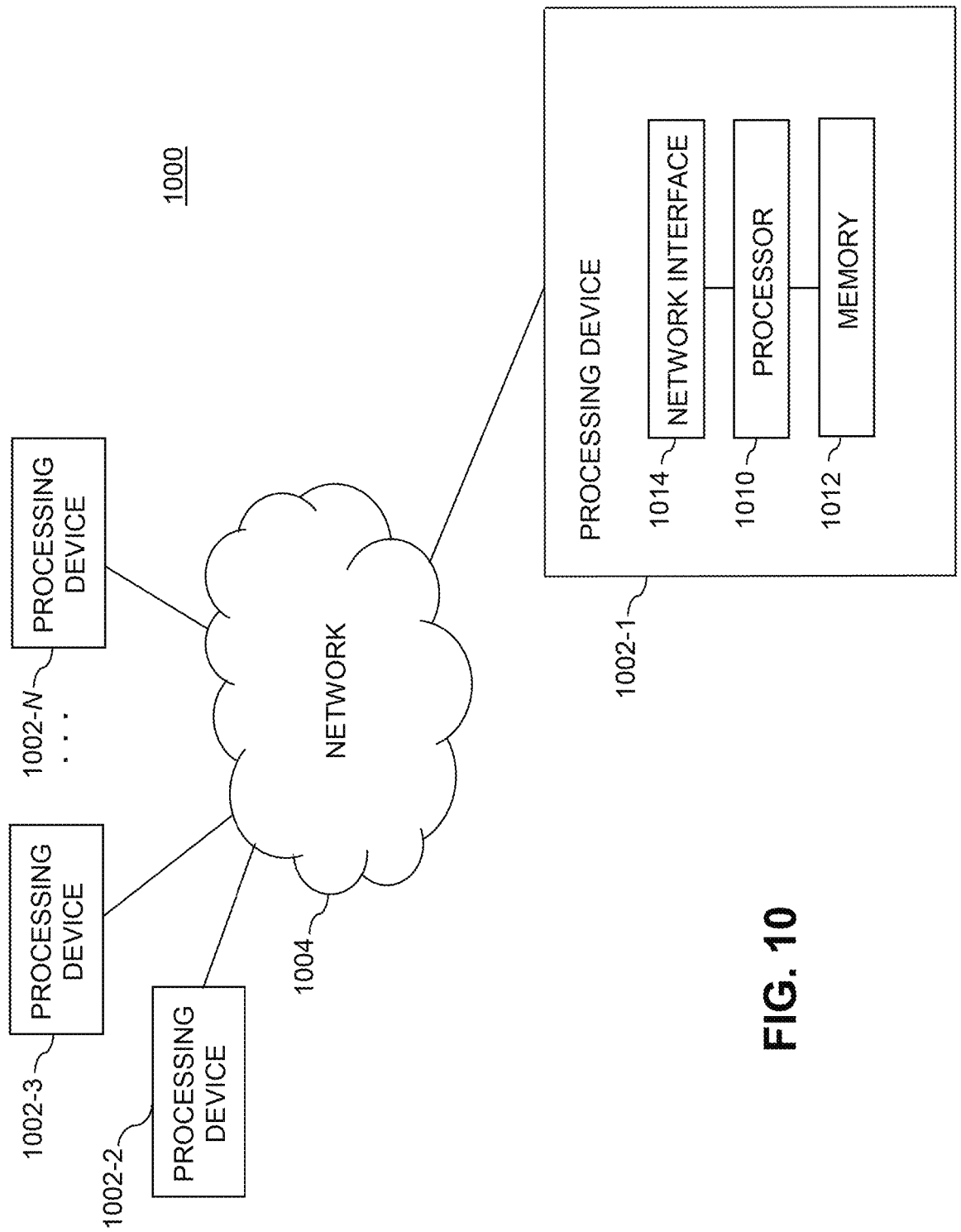
FIG. 10 illustrates a processing platform used to implement a content storage management framework using data valuation-based multi-dimensional models to balance content storage, according to an illustrative embodiment.

Also included in the processing device 1002-1 of the example embodiment of FIG. 10 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a data valuation and content storage management frameworks of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and methods described herein. Such components can communicate with other elements of the system over any type of network or other communication media.

As indicated previously, in some embodiments, components of the data valuation and content storage management frameworks as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems and assets. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:

determining a set of valuations for a set of assets of a given enterprise, wherein the enterprise has a plurality of groups associated therewith, and wherein each of the valuations is determined using a multi-dimensional model that generates cross-group impact values with respect to each asset and two or more of the groups associated with the enterprise, wherein a given cross-group impact value represents one or more costs of sharing a given one of the set of assets between at least a first one of the two or more groups and at least a second one of the two or more groups, and wherein a first cost of transferring the given asset from the first group to the second group is different than a second cost of transferring the data from the second group to the first group;

determining one or more storage locations within a storage infrastructure associated with the enterprise to store the assets based on the valuations for the assets;

executing a content balancing process having logic to compute a given storage location for each asset, the given storage locations being based at least in part on the cross-group impact values; and wherein the content balancing process provides for automatic tracking and relocation of an asset to its respective given storage location upon a determination that a current storage location of the asset is not its given storage location;

wherein determining the set of valuations comprises generating at least two valuations for a given asset with at least two different valuation methodologies, the at least two valuations comprising a first valuation methodology that computes a first type of valuation of the set of assets of the given enterprise and at least a second valuation methodology that computes a second type of valuation of the set of assets of the given enterprise, the first type of valuation comprising a monetary valuation of the set of assets of the given enterprise and the second type of valuation comprising a non-monetary valuation of the set of assets of the given enterprise;

wherein determining the one or more storage locations comprises identifying first and second storage locations for the given asset based on the at least two valuations, wherein the first storage location is different from the second storage location;

wherein the content balancing process is further configured to determine a given one of the first and second storage locations for the given asset and to automatically move the given asset to the given one of the first and second storage locations, the given one of the first and second storage locations corresponding to the given storage location;

wherein the obtaining, determining and executing steps are performed by one or more processing devices, each processing device comprising a processor and a memory.

2. The method of claim 1 wherein automatic tracking and relocation further comprises sending to an entity a request for authorization to move the one or more assets before moving the one or more assets.

3. The method of claim 1, wherein the content balancing process utilizes one or more heat maps associated with the assets to determine given storage locations.

4. The method of claim 1, wherein the content balancing process utilizes one or more graphical representations of the multi-dimensional models to determine given storage locations.

5. The method of claim 1, wherein the storage infrastructure comprises a data protection ecosystem such that the one or more storage locations at which the assets are stored correspond to storage resources of the data protection ecosystem.

6. The method of claim 1, wherein determining one or more storage locations to store the assets further comprises combining two or more multi-dimensional models for two or more assets to form a composite multi-dimensional model.

7. The method of claim 6, wherein the combining step utilizes a linear combination of attributes of each asset, wherein the attributes comprise: elements of the multi-dimensional model for each asset; storage features of a candidate storage location for each asset; and a weighting value.

8. The method of claim 1, wherein determining one or more storage locations to store the assets further comprises applying one or more policies.

9. The method of claim 8, wherein the one or more policies specify that a first subset of the assets is stored at the first storage location and a second subset of the assets is stored at the second storage location.

10. The method of claim 8, wherein the one or more policies specify a ranking for candidate storage locations such that a storage location with a highest ranking is determined to be the given storage location to store one or more of the assets.

11. The method of claim 1, wherein each multi-dimensional model is in the form of a matrix data structure.

12. The method of claim 11, wherein the cross-group impact values are off-diagonal entries in the matrix data structure.

13. The method of claim 12, wherein diagonal entries in the matrix data structure are independent group values that do not reflect cross-group impact.

14. The method of claim 1, wherein the assets comprise sets of data.

15. The method of claim 1, wherein the given cross-group impact value represents a cost of one or more of communication and dependencies between the first and second groups.

16. An article of manufacture comprising a non-transitory processor-readable storage medium having encoded therein executable code of one or more software programs, wherein the one or more software programs when executed by one or more processing devices implement steps of:

determining a set of valuations for a set of assets of a given enterprise, wherein the enterprise has a plurality of groups associated therewith, and wherein each of the valuations is determined using a multi-dimensional model that generates cross-group impact values with respect to each asset and two or more of the groups associated with the enterprise, wherein a given cross-group impact value represents one or more costs of sharing a given one of the set of assets between at least a first one of the two or more groups and at least a second one of the two or more groups, and wherein a first cost of transferring the given asset from the first group to the second group is different than a second cost of transferring the data from the second group to the first group;

determining one or more storage locations within a storage infrastructure associated with the enterprise to store the assets based on the valuations for the assets; and executing a content balancing process having logic to compute a given storage location for each asset, the given storage locations being based at least in part on the cross-group impact values;

wherein the content balancing process provides for automatic tracking and relocation of an asset to its respective given storage location upon a determination that a current storage location of the asset is not its given storage location;

wherein determining the set of valuations comprises generating at least two valuations for a given asset with at least two different valuation methodologies, the at least two valuations comprising a first valuation methodology that computes a first type of valuation of the set of assets of the given enterprise and at least a second valuation methodology that computes a second type of valuation of the set of assets of the given enterprise, the first type of valuation comprising a monetary valuation of the set of assets of the given enterprise and the second type of valuation comprising a non-monetary valuation of the set of assets of the given enterprise;

wherein determining the one or more storage locations comprises identifying first and second storage locations for the given asset based on the at least two valuations, wherein the first storage location is different from the second storage location; and wherein the content balancing process is further configured to determine a given one of the first and second storage locations for the given asset and to automatically move the given asset to the given one of the first and second storage locations, the given one of the first and second storage locations corresponding to the given storage location.

17. A system comprising:

one or more processors operatively coupled to one or more memories configured to:

determine a set of valuations for a set of assets of a given enterprise, wherein the enterprise has a plurality of groups associated therewith, and wherein each of the valuations is determined using a multi-dimensional model that generates cross-group impact values with respect to each asset and two or more of the groups associated with the enterprise, wherein a given cross-group impact value represents one or more costs of sharing a given one of the set of assets between at least a first one of the two or more groups and at least a second one of the two or more groups, and wherein a first cost of transferring the given asset from the first group to the second group is different than a second cost of transferring the data from the second group to the first group;

determine one or more storage locations within a storage infrastructure associated with the enterprise to store the assets based on the valuations for the assets; and execute a content balancing process having logic to compute a given storage location for each asset, the given storage locations being based at least in part on the cross-group impact values;

wherein the content balancing process provides for automatic tracking and relocation of an asset to its respective given storage location upon a determination that a current storage location of the asset is not its given storage location;

wherein determining the set of valuations comprises generating at least two valuations for a given asset with at least two different valuation methodologies, the at least two valuations comprising a first valuation methodology that computes a first type of valuation of the set of assets of the given enterprise and at least a second valuation methodology that computes a second type of valuation of the set of assets of the given enterprise, the first type of valuation comprising a monetary valuation of the set of assets of the given enterprise and the second type of valuation comprising a non-monetary valuation of the set of assets of the given enterprise;

wherein determining the one or more storage locations comprises identifying first and second storage locations for the given asset based on the at least two valuations, wherein the first storage location is different from the second storage location;

wherein the content balancing process is further configured to determine a given one of the first and second storage locations for the given asset and to automatically move the given asset to the given one of the first and second storage locations, the given one of the first and second storage locations corresponding to the given storage location.

18. The article of manufacture of claim 16, wherein the content balancing process utilizes at least one of the following:
   one or more heat maps associated with the assets to determine given storage locations; and
   one or more graphical representations of the multi-dimensional models to determine given storage locations.

19. The system of claim 17, wherein the content balancing process utilizes at least one of the following:
   one or more heat maps associated with the assets to determine given storage locations; and
   one or more graphical representations of the multi-dimensional models to determine given storage locations.

* * * * *